United States Patent [19]

Thenon

[11] 4,203,234

[45] May 20, 1980

[54] ROLLABLE CHART

[75] Inventor: Christian Thenon, Chatillon-sur-Cluses, France

[73] Assignee: De Visu International, Igny Zai, France

[21] Appl. No.: 922,530

[22] Filed: Jul. 7, 1978

[30] Foreign Application Priority Data

Jul. 8, 1977 [FR] France ................................ 77 21396

[51] Int. Cl.[2] ............................................... G09B 29/06

[52] U.S. Cl. ........................................... 35/76; 40/519; 40/522

[58] Field of Search ............... 35/62, 76; 40/518, 519, 40/522

[56] References Cited

U.S. PATENT DOCUMENTS

| | | | |
|---|---|---|---|
| 432,914 | 7/1890 | Terrell | 40/522 |
| 577,196 | 2/1897 | Moulthrop | 35/76 |
| 1,237,636 | 8/1917 | Gribble | 40/518 X |
| 1,585,342 | 5/1926 | Gilbert | 35/76 UX |
| 1,618,760 | 2/1927 | Koelkebeck | 40/518 X |

FOREIGN PATENT DOCUMENTS 4547 of 1896 United Kingdom ........................ 35/76

*Primary Examiner*—Harland S. Skogquist
*Attorney, Agent, or Firm*—Brisebois & Kruger

[57] ABSTRACT

A rollable chart having a web of flexible material wound about two rollers. An endless band extends around pulleys adjacent each roller for manual manipulation. Two unidirectional driving devices are provided each including an internally toothed surface, a disk axially adjacent the toothed surface formed with an inclined cam groove with which a pin on a sliding pawl cooperates.

3 Claims, 4 Drawing Figures

ROLLABLE CHART

This invention relates to rollable chart-boards comprising a unique manual driving means interconnecting two turnably mounted components connected angularly with respect to two rotatable supports disposed parallel to one another, which support the rolled ends of a web of flexible material which provides a surface for writing and/or reading. The angular connection is effected by mechanisms which permit the rolling up of one end of the web on one rotatable support and simultaneously unrolling the other end from the other rotating support, while maintaining tautness between the two supports.

In known devices of this type, such as that described in French Pat. No. 385,347, the manual driving means is constituted by a crank activated in either of two directions of rotation. It is necessary to make several turns of the crank to move the web one "page", that is to say, a distance corresponding to the length of the portion of the web being displayed. This operation is relatively slow, especially when it is desired to rapidly move the web several "pages" ahead or back, and when this operation must be repeated frequently. This is, for example, the case when a chart of this type is utilized as a lecture board.

The rollable chart-board in accordance with this invention remedies such inconvenience. It permits, with the aid of a very simple device, very rapid displacement of the web forward, backward, or for several "pages", avoiding any delay while using the chart.

The rollable chart-board which is the object of the invention, has a unique driving means constituted of an endless flexible strap, which cooperates simultaneously with two sheaves, each of which is attached to one of the two turning elements. This endless flexible strap is accessible from the front of the rollable chart-board, even when a housing covers the mechanisms which unite each turning element with its corresponding rotating support. The strap is capable of being moved manually, by grasping it at a location between the two sheaves and pulling on it in either direction, causing the movement of the web of flexible material in front of the rigid surface of the chart.

The attached drawings illustrate an example of one embodiment conforming to the invention.

Figure 1:
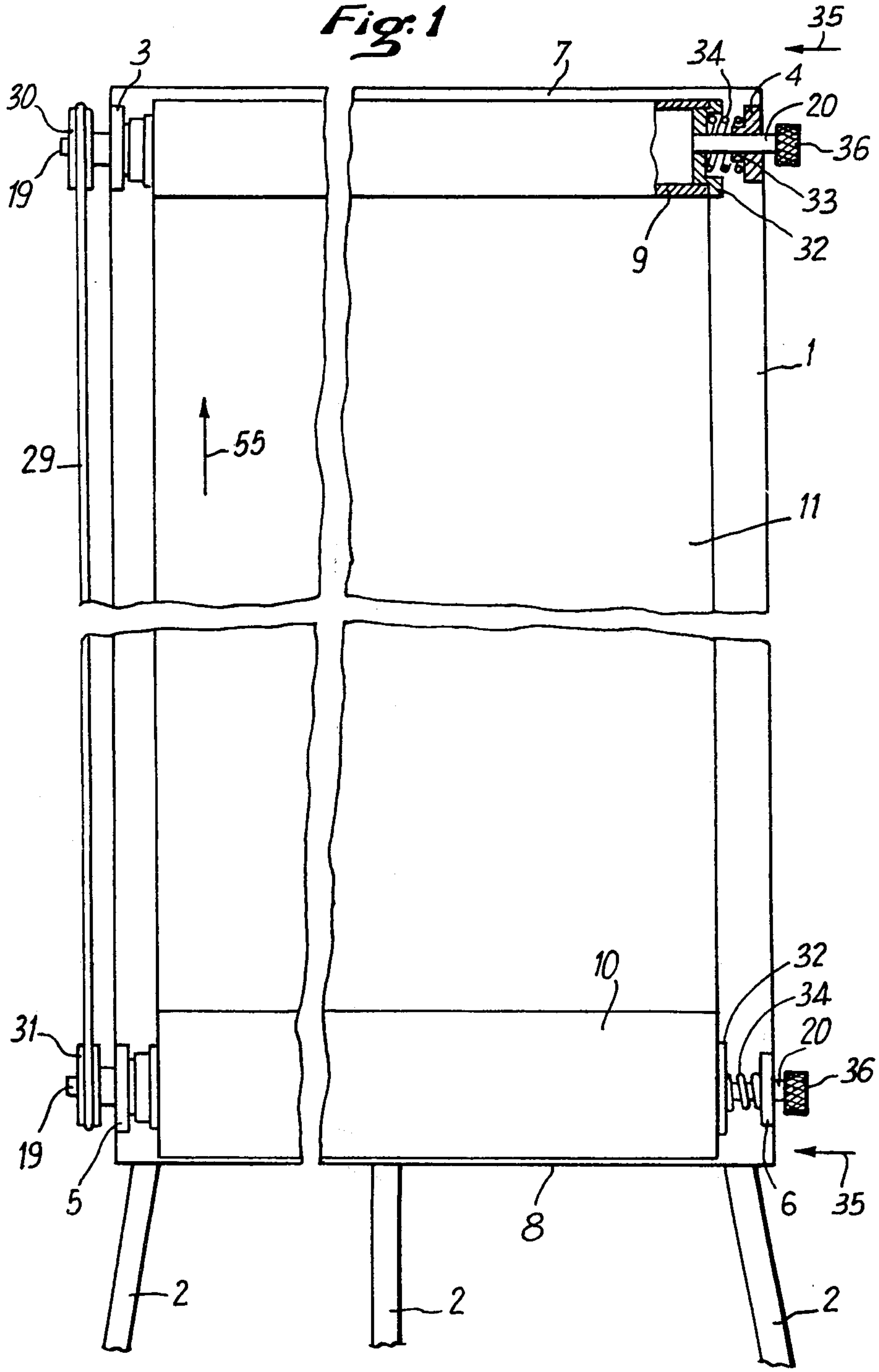
FIG. 1 shows a front view of the embodiment.
Figure 2:
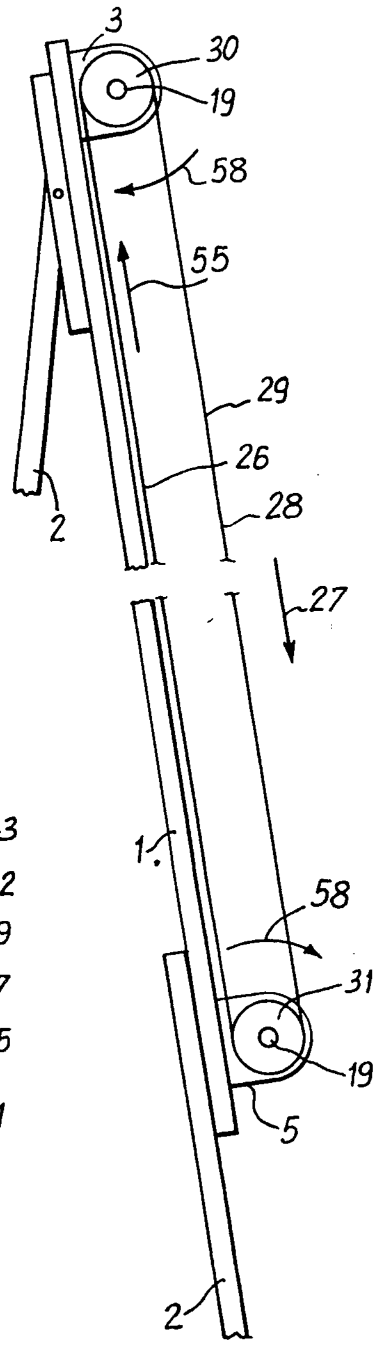
FIG. 2 shows the same embodiment, viewed from the left side of FIG. 1.

As shown in FIGS. 1 and 2, the rollable chart-board has a rigid plane surface 1, which is, for example, essentially vertical, and supported on the ground by feet 2, partially shown. Plates 3 and 4 are secured to the upper end of the rigid surface 1. Plates 5 and 6 are attached to the lower end 8. Each pair of plates 3, 4 and 5, 6 supports a rotatable cylinder, respectively, 9 and 10, on which is wrapped one end of a web of flexible material, of for example, paper. The two rotating cylinders 9 and 10 are positioned parallel to each other. The rigid surface 1 is located directly behind the paper web 11, and in this way permits writing on the paper web, which is kept taut between the two rotating cylinders 9 and 10.

Figure 3:
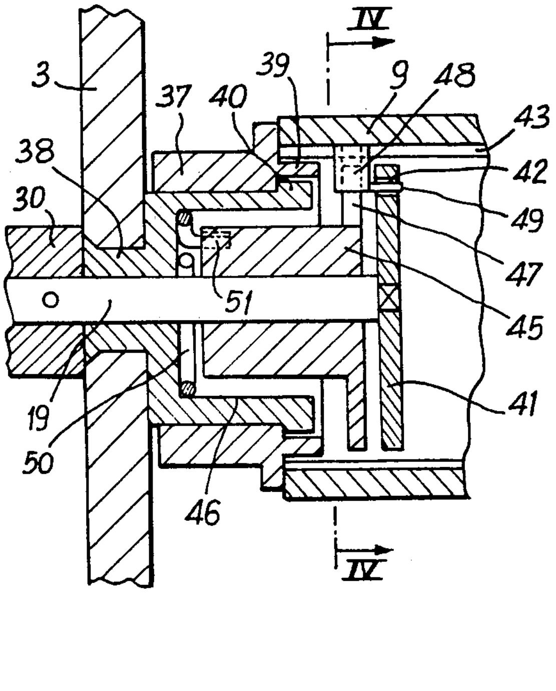
FIG. 3 shows, on a larger scale, a view partially in section of one of the mechanisms providing the angular connection between each turning component and its corresponding rotatable support.

As shown in FIGS. 1 and 3, the rotating cylinders 9 and 10, which are, in this example, identical, comprise at their ends, axles 19 and 20. The sheaves or pulleys 30 and 31 are fixedly attached to the axles 19. An endless flexible strap, for example, an elastic belt 29, connects the two sheaves 30 and 31. Each rotating cylinder 9 or 10 contains at one of its extremities (FIG. 1) a first centering component 32 whose dimensions are such as to permit it to fit in the interior of the rotating cylinder 9 or 10. Each centering component 32 is located at the inner end of the axles 20. The axles 20 turn in bearings 33 fixed to plates 4 and 6. A helical compression spring 34 forces the centering component 32 in the direction denoted by 35, the movement being limited by a stop 36 formed at the outer end of each axle 20. This stop 36 also serves as an adjusting knob to move the corresponding centering component in a direction opposite to that denoted by 35 and against the action of the spring 34.

As also shown in FIG. 3, the other end of the rotating cylinder, 9 for example in this FIG., has teeth 43 on its interior surface and fits over a second centering component 37, rotatably mounted on a fixed bearing 38 attached to the plate 3. A relatively large radial clearance is provided between the exterior 39 of the centering component 37 and the interior of the rotating cylinder 9. Second centering component 37 is retained axially on a fixed bearing 38 by a flange 40 on the bearing 38. The axle 19 is rotatably mounted in the same bearing 38. The end of the axle 19 which is opposite to sheave 30 has a disk 41 fixed to it, to constitute a first turning element provided for interconnection with the rotating cylinder 9. In the same fashion, the end of the other axle 19, opposite to sheave 31, has a corresponding disk 41 which it supports to form a second turning element provided for interconnection with the other rotating cylinder 10. Each of these turning elements forms one element of a unidirectional driving mechanism which constitutes, by example, the means of angularly connecting the turning element with the corresponding rotating cylinder. Each disk 41 has three inclined slots 42 located 120 degrees apart, the two sides of each slot forming parallel cams. An alignment support 45, located in the bore 46 of the bearing 38, is mounted on the central part of the axle 19 and has three radial guide slots 47 adjacent to each disk 41. In each guide slot 47 is located a pawl 48 having a pin 49 extending axially into one of the angular slots 42 of the disk 41. Each pawl 48 has teeth of a profile corresponding to the teeth 43. In the base of the bearing bore 46 is located an elastic ring 50 which is forced against the periphery of the bore 46; one part 51 of this ring 50 is connected perpendicularly into an opening provided in the alignment support 45. For simplification in FIG. 3, only one of components 42, 47, 48, and 49 is shown.

The assembly of the components associated with the rotating cylinder, 9 for example, are accomplished in the reverse direction from that denoted by 35 (FIG. 1): first, the centering component 32; then, one of the ends of cylinder 9 is brought over the second centering component 37; finally, the centering component 32 is released in the direction denoted by 35. The second rotating cylinder 10, on which is rolled, in this example, the web of paper 11, is assembled in the same fashion. The free end of the web of paper 11 is then connected to the rotating cylinder 9. The rollable chart-board is ready to work.

Figure 4:
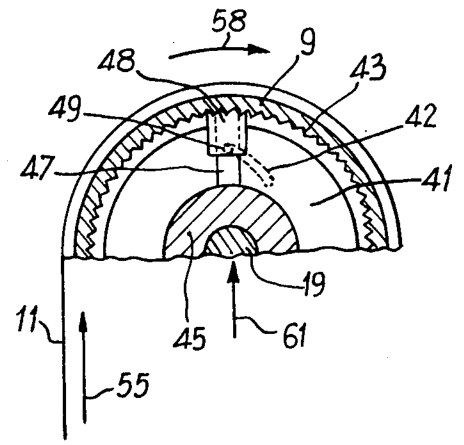
FIG. 4 shows a view along IV—IV on FIG. 3 of the same angular connection mechanism.

To move the web of paper 11 across the rigid surface 1 one need only grasp the part 28 of the elastic belt 29 in the vicinity of the sheave 30 located near the top of the chart (FIG. 2), and to move this part 28 the length of the rigid surface in the direction denoted by 27. At the same time, the web of paper 11 (FIG. 1) is shifted toward the top in the direction denoted by 55. Specifically, movement of the part 28 in the direction denoted by 27 causes rotation of the sheave 31 and of its axle 19 (FIG. 2) in the direction denoted by 58 and simultaneously of the sheave 30 and of its axle 19 (FIGS. 2 and 4). The discs 41 likewise rotate as denoted by 58. In the interior of the rotating cylinders 9 and 10, the alignment support 45 would remain immobile during rotation, save for the action of the spring ring 50 which is located in the bore 46 of the fixed bearing 38. The slots 42 of the disk 41 located in rotating cylinder 9 (FIG. 4) are driven in rotation as denoted by 58 and their orientation is such that each of them drive the pawl 48 through the intermediary of the pin 49 in the direction denoted by 61. The toothed outer surface of the pawls 48 meshes with the toothed interior of the rotating cylinder 9 which is, at this point, no longer centered and supported by the centering component 37 but by the teeth of the three pawls 48. The rotating cylinder 9 is driven by the interior teeth 43 in the direction of rotation denoted by 58 and the web of paper 11 is moved as denoted by 55. At the same time, the slots 42 of the disk 41 located in rotating cylinder 10, not shown in detail on the drawings, are driven in rotation as denoted by 58 and their orientation is such that each drives a pawl 48 through the intermediary of a pin 49 in a direction which keeps the pawl away from the interior surface of the rotating cylinder 10, which is then supported by the centering component 37 and which thus would not be driven in the direction 58 except for the action of the pull exerted in the direction 55 by the paper web rolling up on the rotating cylinder 9.

When it is desired to move the roll of paper in a direction opposite to that denoted by 55, that is downward, one need only grasp, in this example, part 26 of the elastic belt 29, near the sheave 30 (FIG. 2), and to move this part 26 in the direction denoted by 27, the length of the rigid surface 1. At the same time, the teeth 43 in the rotating cylinder 10 are driven by the corresponding teeth on the pawls 48 located within this rotating cylinder 10, while the teeth on the pawls 48 located in the other rotating cylinder 9 are disengaged from the teeth 43 on said rotating cylinder 9. The web of paper 11 is rolled up on the rotating cylinder 10, and unwinds freely from rotating cylinder 9.

During these displacements in one direction or the other, the web of paper rests properly tensioned stretched on top of the rigid surface 1, between the two rotating cylinders 9 and 10. The elastic belt 29 thus constitutes a unique manual driving means, easily accessible, permits rapid movement of the web of paper 11 in one direction or the other, all the while maintaining the paper taut. The diameter of the sheaves 30 and 31 can advantageously be smaller than either of the rotating cylinders 9 and 10; if so, it would not be necessary to move parts 26 or 28 of the belt 29 the length of the rigid surface 1 in order to displace one "page"; it is thereby possible to shift the web 11 several "pages" rapidly in either direction, if this is desired.

Without exceeding the scope of this invention, the connecting mechanism between the manual driving means, and the two turning elements may not be absolutely rigid, but may to the contrary have some angular clearance, as is the case in the previous art cited in this patent. Likewise, the rotating cylinders may also be located behind the rigid surface. Also, the mechanisms constituting the angular connection between the two turning elements and the rotating cylinders may be of any design. Likewise, only one of the parts, 28 for example, of the belt 29, may be accessible from the front of the chart-board, while the other part may be covered by a housing.

The arrangement, the object of the invention, may be utilized in all cases where it may be desired to operate a rollable chart very rapidly by manual control.

I claim:

1. A rollable chart comprising
a base
a first rotatable support on said base,
a second rotatable support on said base in spaced parallel relation to said first support,
a web of flexible material wound on the first support and the second support and having an exposed portion between the supports
a first pulley adjacent said first rotatable support,
a second pulley adjacent said second rotatable support
an endless flexible band extending around said pulleys, said band being exposed and comprising means for manually rotating said pulleys in response to manual manipulation of said band,
first unidirectional driving means for connecting said first pulley to said first rotatable support to wind said web onto said support in response to manual movement of said band in a first direction, and second unidirectional driving means for connecting said second pulley to said second rotatable support in response to manual movement of said band in the opposite direction, each unidirectional driving means comprising
an internally toothed surface near one end of a support,
a disc fixed to a pulley for rotation therewith, said disc being axially adjacent said toothed surface, an inclined cam groove formed in said disc,
a sliding pawl having a pin extending into said cam groove, and
means for guiding the pawl radially toward and away from the internally toothed surface,
said cam groove forcing said pawl into driving engagement with said internally toothed surface in response to rotation of its pulley in one direction, and maintaining said pawl spaced from the internally toothed surface in response to rotation of its pully in an opposite direction.

2. A rollable chart according to claim 1 wherein
said means for guiding each pawl radially comprises
a disc concentric with a pulley and having a radial slot, and means frictionally connecting said disc to a bearing of the pulley.

3. A rollable chart according to claim 2 wherein
said means frictionally connecting said disc to a bearing comprises, a circular spring frictionally engaging an interior of the bearing, and having an end secured to said disc, said spring tending to expand in response to rotation of the pulley in a direction to cause said pawl to engage said teeth.

* * * * *